(12) United States Patent
Chu (10) Patent No.: US 6,182,119 B1
(45) Date of Patent: *Jan. 30, 2001

(54) DYNAMICALLY CONFIGURABLE FILTERED DISPATCH NOTIFICATION SYSTEM

(75) Inventor: Clare Chu, Fremont, CA (US)

(73) Assignee: Cisco Technology, Inc., San Jose, CA (US)

(*) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/982,879

(22) Filed: Dec. 2, 1997

(51) Int. Cl.[7] .............................. G06F 15/16; G06F 15/17
(52) U.S. Cl. ...................... 709/206; 709/218; 709/202; 707/10
(58) Field of Search ..................................... 709/218–220, 709/206, 202; 707/1, 10, 3

(56) References Cited

U.S. PATENT DOCUMENTS 5,857,190 * 1/1999 Brown ..................................... 707/10
5,867,799 * 2/1999 Lang et al. ............................... 707/1

OTHER PUBLICATIONS

Hood et al., "Proactive Network Fault Detection", IEEE Communications Conference, Apr. 12, 1997.*
Thottan et al., "Adaptive Thresholding for Proactive Network Problem Detection", IEEE Conference, 1998.*

* cited by examiner

Primary Examiner—Mark H. Rinehart
Assistant Examiner—Marc D. Thompson
(74) Attorney, Agent, or Firm—Hickman Palermo Truong & Becker LLP (57) ABSTRACT

A method and system for filtering and acting upon data are provided. The specific identity, behavior and relationship between the various components that make up the system are not fixed at compile time. Rather, flexibility is maintained by establishing the identity, behavior and relationships based on configuration data at run time. At run time, various source, filter and action modules that are specified in configuration data are loaded into dynamic memory and initialized. The publisher-subscriber relationships are then established between the loaded modules based on said configuration data. A user interface is provided which allows a user to specify changes to the publisher-subscriber relationships between the components, or to the initialization arguments of the components. The various components of the system may be implemented as objects that are instances of JAVA classes.

36 Claims, 3 Drawing Sheets

DYNAMICALLY CONFIGURABLE FILTERED DISPATCH NOTIFICATION SYSTEM

FIELD OF THE INVENTION

The present invention relates to network management systems, and more particularly, to a method and apparatus for identifying important information among the total information collected by network management systems.

BACKGROUND OF THE INVENTION

Network management systems often have access to enormous amounts of data about the networks that they manage. Such data includes, for example, "syslog" messages generated by routers, and Management Information Base variables ("MIB variables") received in response to polling the various devices on the networks.

Typically, this data is stored in the form of log files. Because of the volume of data available to network management systems, it is relatively easy for important pieces of information ("key information") to go undetected, effectively lost deep inside a log file. For example, among the "syslog" messages generated by a router, there may be a single "configuration change" message hidden among thousands of relatively unimportant "link-up" and "link-down" messages. Detection of such a configuration change message may be the key to determining why a particular section of the network ceased to function properly.

The volume of collected data is such that it is not practical for network administrators to manually sift through the log files on a real-time basis to uncover key information. Consequently, attempts have been made to automate the discovery of key information. One such attempt involves the ad-hoc creation of shell or PERL scripts. Such scripts may be coded to read the log files searching for data that has certain characteristics. If data that satisfies the programmed criteria of a script is detected by the script, the script performs some predefined action.

Alternatively, complex analytical tools may be used to sift through the log files. For even basic filtering, such tools often require the use of relatively complex inference engines, event forwarding discriminators, and/or complex correlation codebooks.

One disadvantage of both the script approach and the analytical tool approach is that they do not provide real-time feedback. Thus, important information remains undetected until a detection tool is executed. For example, if a script file begins executing at time T10, it may take until time T20 before the script indicates that key information was received at time T1. Similarly, an analytical tool executed at time T10 may discover at time T20 the key information received at time T1. Such delays in detection are unacceptable in situations where it is critical to immediately act upon key information.

Another approach to detecting key information is to analyze the information in real-time as it arrives from one or more sources. Such sources could include, for example, a socket, a log file or a log file reader. Programs that perform such real-time analysis are referred to as filtering systems.

One problem with typical filtering systems is that they are inflexible with respect to the type of key information they detect, and the data sources with which they work. For example, a typical filtering system is delivered pre-compiled with filters, actions and source modules, as well as the connections between the various modules, already in place. Because the filters, actions and source modules and connections are effectively hard-coded, a user cannot adjust the operation of the filtering systems in response to changes. Changes that may require behavioral or connection changes in filtering systems may include, for example, changes in (1) which information is considered key information and (2) the number and type of sources supplying the information and (3) the number and type of actions to be triggered upon receipt of information that is considered key.

Based on the foregoing, it is clearly desirable to provide a mechanism for detecting and acting upon key information supplied by one or more sources. It is further desirable to provide a mechanism that is flexible enough to be adapted to the changing needs and configurations of the system in which it is employed.

SUMMARY OF THE INVENTION

A method and system for filtering and acting upon data are provided. The specific identity, behavior and relationship between the various components that make up the system are not fixed at compile time. Rather, flexibility is maintained by establishing the identity, behavior and relationships based on configuration data at run time.

According to one aspect of the invention, the configuration data specifies a set of source modules, a set of filter modules, a set of action modules, and publisher-subscriber relationships between the source modules, filter modules, and action modules. At run time, the various modules specified in the configuration data are loaded into dynamic memory and initialized. The publisher-subscriber relationships are then established between the loaded modules based on the configuration data. The source modules then begin execution.

According to another aspect of the invention, the behavior of the various components is determined by arguments passed to the components when they are initialized. A user interface is provided which allows a user to specify changes to the publisher-subscriber relationships between the components, or to the initialization arguments of the components. In response to user input that specifies changes publisher-subscriber relationships, subscriber lists maintained by the components are changed. In response to user input that specifies changes to initialization arguments, the components are re-initialized with the new arguments.

According to one embodiment, the various components are implemented as objects that are instances of JAVA classes. After being loaded and initialized, the source objects are launched to begin execution in their own threads. The filter and action objects execute when invoked by objects, such as source objects and other filter objects, that are executing.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

A method and apparatus for filtering and acting upon data is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Hardware Overview

Figure 1:
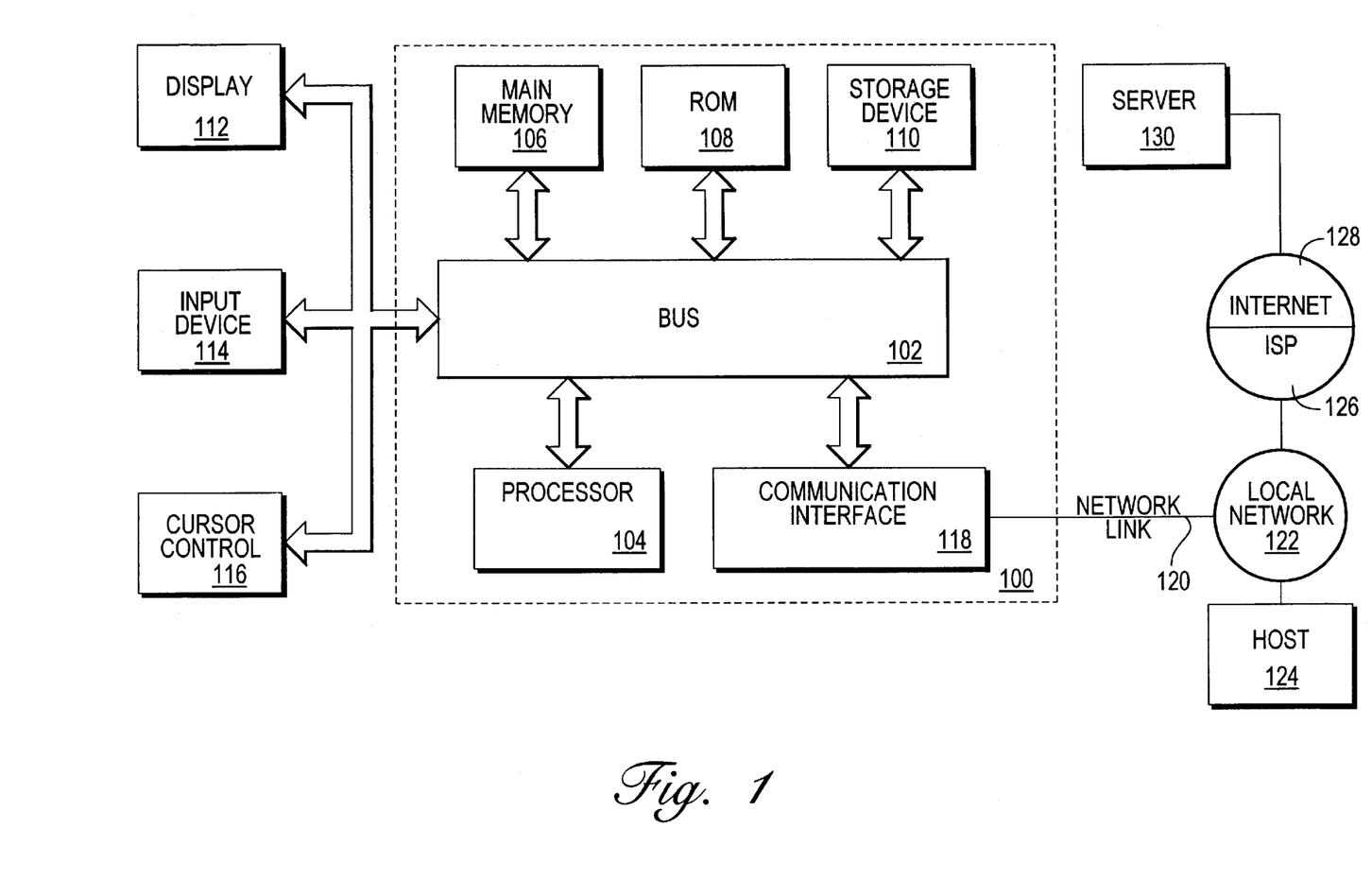
FIG. 1 is a block diagram illustrating a computer system that may be used to implement the invention.

FIG. 1 is a block diagram that illustrates a computer system 100 upon which an embodiment of the invention may be implemented. Computer system 100 includes a bus 102 or other communication mechanism for communicating information, and a processor 104 coupled with bus 102 for processing information. Computer system 100 also includes a main memory 106, such as a random access memory (RAM) or other dynamic storage device, coupled to bus 102 for storing information and instructions to be executed by processor 104. Main memory 106 also may be used for storing temporary variables or other intermediate information during execution of instructions to be executed by processor 104. Computer system 100 further includes a read only memory (ROM) 108 or other static storage device coupled to bus 102 for storing static information and instructions for processor 104. A storage device 110, such as a magnetic disk or optical disk, is provided and coupled to bus 102 for storing information and instructions.

Computer system 100 may be coupled via bus 102 to a display 112, such as a cathode ray tube (CRT), for displaying information to a computer user. An input device 114, including alphanumeric and other keys, is coupled to bus 102 for communicating information and command selections to processor 104. Another type of user input device is cursor control 116, such as a mouse, a trackball, or cursor direction keys for communicating direction information and command selections to processor 104 and for controlling cursor movement on display 112. This input device typically has two degrees of freedom in two axes, a first axis (e.g., x) and a second axis (e.g., y), that allows the device to specify positions in a plane.

The invention is related to the use of computer system 100 for filtering, dispatching and acting upon information. According to one embodiment of the invention, message filtering and dispatching is performed by computer system 100 in response to processor 104 executing one or more sequences of one or more instructions contained in main memory 106. Such instructions may be read into main memory 106 from another computer-readable medium, such as storage device 110. Execution of the sequences of instructions contained in main memory 106 causes processor 104 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 104 for execution. Such a medium may take many forms, including but not limited to, non-volatile media, volatile media, and transmission media. Non-volatile media includes, for example, optical or magnetic disks, such as storage device 110. Volatile media includes dynamic memory, such as main memory 106. Transmission media includes coaxial cables, copper wire and fiber optics, including the wires that comprise bus 102. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 104 for execution. For example, the instructions may initially be carried on a magnetic disk of a remote computer. The remote computer can load the instructions into its dynamic memory and send the instructions over a telephone line using a modem. A modem local to computer system 100 can receive the data on the telephone line and use an infra-red transmitter to convert the data to an infra-red signal. An infra-red detector coupled to bus 102 can receive the data carried in the infra-red signal and place the data on bus 102. Bus 102 carries the data to main memory 106, from which processor 104 retrieves and executes the instructions. The instructions received by main memory 106 may optionally be stored on storage device 110 either before or after execution by processor 104.

Computer system 100 also includes a communication interface 118 coupled to bus 102. Communication interface 118 provides a two-way data communication coupling to a network link 120 that is connected to a local network 122. For example, communication interface 118 may be an integrated services digital network (ISDN) card or a modem to provide a data communication connection to a corresponding type of telephone line. As another example, communication interface 118 may be a local area network (LAN) card to provide a data communication connection to a compatible LAN. Wireless links may also be implemented. In any such implementation, communication interface 118 sends and receives electrical, electromagnetic or optical signals that carry digital data streams representing various types of information.

Network link 120 typically provides data communication through one or more networks to other data devices. For example, network link 120 may provide a connection through local network 122 to a host computer 124 or to data equipment operated by an Internet Service Provider (ISP) 126. ISP 126 in turn provides data communication services through the world wide packet data communication network now commonly referred to as the "Internet" 128. Local network 122 and Internet 128 both use electrical, electromagnetic or optical signals that carry digital data streams. The signals through the various networks and the signals on network link 120 and through communication interface 118, which carry the digital data to and from computer system 100, are exemplary forms of carrier waves transporting the information.

Computer system 100 can send messages and receive data, including program code, through the network(s), network link 120 and communication interface 118. In the Internet example, a server 130 might transmit a requested code for an application program through Internet 128, ISP 126, local network 122 and communication interface 118.

The received code may be executed by processor 104 as it is received, and/or stored in storage device 110, or other non-volatile storage for later execution. In this manner, computer system 100 may obtain application code in the form of a carrier wave.

Functional Overview

A dispatcher system is provided in which components of the system communicate with each other based on a subscriber/publisher model. In a subscriber/publisher model, modules that produce messages ("publishers") maintain a "subscriber list" of modules ("subscribers") that are interested in receiving the messages the publishers produce. When a publisher produces a message, the publisher transmits the message to each of the subscribers in its subscriber list. Within a subscriber/publisher system, a particular module may be only a publisher, only a subscriber, or both a publisher and a subscriber.

According to one embodiment of the invention, a dispatcher system is provided in which the tasks associated with responding to key information are divided up among modules referred to herein as source objects, filter objects and action objects.

Source objects are publishers that receive or retrieve data from a source and transmit the data to a set of subscribers. According to one embodiment, each source object maintains a list of the subscribers to which it must send the data that is received from the source associated with the source object.

Filter objects are typically both publishers and subscribers. Filter objects receive messages from publishers and provide filtering criteria that decides whether the message should be dispatched to its subscribers. Filters may also transform the message if so designed. The main function of a filter is to decide whether the message embodies key information which the user is interested in.

Action objects are typically subscribers that receive messages from the publishers with which they are registered. Action objects respond to the messages by performing actions dictated by their logic. The type of action will vary from action object to action object. For example, one class of action object may execute a script generating an alert to a network management station (NMS) while another class of action object may trigger an update to a database.

According to one embodiment of the invention, the specific components and relationship between components of a dispatch system are established by a coordinator process, referred to herein as a dispatch system coordinator, based on information contained in a configuration file.

Dispatch System Coordinator

A dispatch system coordinator is a module that reads and parses a configuration file and sets up a dispatcher system based on the configuration file. The configuration file indicates the source objects, filter objects, and action objects that are to be used in a particular dispatch system, and the relationships between the source, filter and action objects.

After reading and parsing the configuration file, the dispatch system coordinator loads and initializes the sources identified in the configuration file. The dispatch system coordinator then loads and initializes the filters identified in the configuration file. After the sources and the filters have been loaded and initialized, the dispatch system coordinator subscribes the filter objects to the source objects as specified in the configuration file.

The action objects specified in the configuration file are then loaded and initialized. After the action objects are loaded and initialized, the dispatch system coordinator subscribes the action objects to the filter objects as specified in the configuration file.

After the source, filter and action objects have been loaded, initialized, and all of the appropriate subscriptions have been made, the dispatch system coordinator launches the sources by causing each source object to begin execution in its own thread.

According to one embodiment of the invention, the dispatch system coordinator communicates, in a separate thread, with a management process or user interface to start, stop, or reconfigure the executing dispatch system or a particular component thereof. Such a user interface may include, for example, controls for displaying the parameter values currently in effect for each module within the dispatch system, and controls for modifying the parameter values while the dispatch system is in operation.

Configuration Data

As mentioned above, the dispatch system coordinator is configured to load, initialize and establish subscriptions between the various components of a dispatch system based on configuration data. According to one embodiment of the invention, the configuration data, which may be stored in one or more files, identifies sources by the keyword SRC, filters by the keyword FLT, and actions by the keyword ACT. In addition, configuration data specifies subscriptions between components based on the rules: (1) filters subscribe to the source that most immediately precedes them in the configuration data, and (2) actions subscribe to the filter that most immediately precedes them in the configuration data.

An exemplary set of configuration data that uses this format is:

SRC LogReader/tmp/syslog__info
        FLT SimpleTextFilter deny ISDN
            ACT ShellAction log.sh no__isdn.txt
        FLT NullFilter
            ACT NativeSyslog
            ACT ShellAction log.sh my__syslog.txt
    SRC SocketReader 9009
        FLT ReverseFilter
            ACT ShellAction echo
            ACT ShellAction log.sh reverse.txt In response to this configuration data, the dispatch system coordinator would load and initialize two source objects (LogReader and SocketReader), three filter objects (SimpleTextFilter, NullFilter and ReverseFilter) and five action objects (NativeSyslog and four instances of ShellAction).

Based on the subscription rules specified above, the dispatch system coordinator would subscribe the SimpleTextFilter to the LogReader, and the first instance of ShellAction to the SimpleTextFilter. The NullFilter would be subscribed to the LogReader, and the NativeSyslog and second instance of ShellAction would be subscribed to the NullFilter. The ReverseFilter would be subscribed to the SocketReader, and the third and fourth instances of ShellAction would be subscribed to the ReverseFilter.

As illustrated in the above example, the configuration data may specify parameter values with which various modules are to be initialized. The parameter values used to initialize a particular module can significantly impact the behavior of the module. For example, the first instance of the ShellAction action object is followed by the parameter values log.sh no_isdn.txt. When initialized with these parameter values, the ShellAction action object will respond to messages by executing a shell program named "log.sh" that will store its results in a text file named no_isdn.txt. If different parameters are supplied, the ShellAction object may respond to messages by executing a shell script that does something completely different than the log.sh shell script.

Configuration Data Processing

According to one embodiment of the invention, the dispatch system coordinator processes the configuration data in the forward direction when loading the various components of the system, and in the backward direction when establishing the publisher/subscriber relationships between the components.

Figure 2:
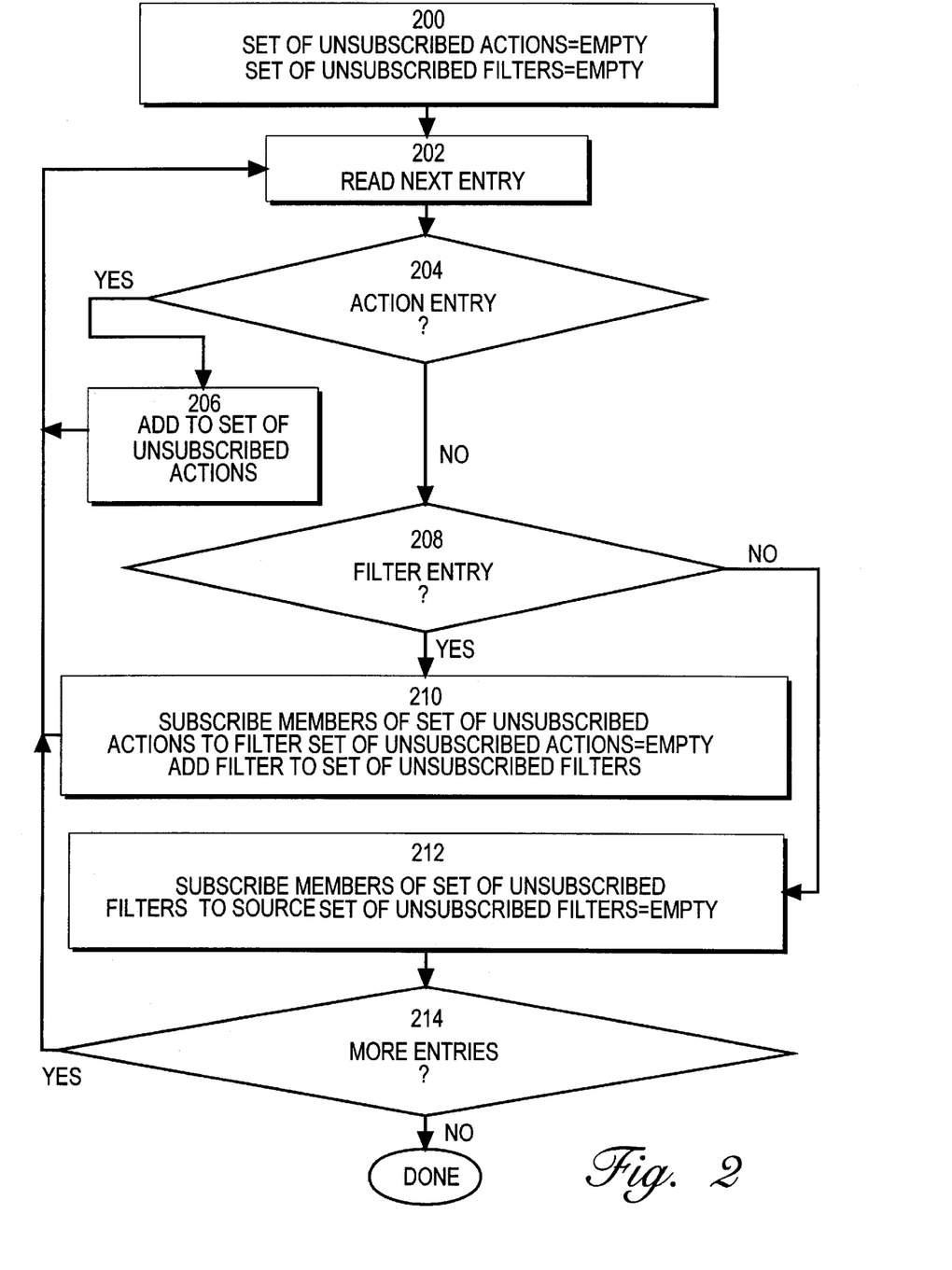
FIG. 2 is a flow chart illustrating steps for establishing subscriptions based on configuration data according to an embodiment of the invention.

FIG. 2 is a flow chart illustrating the operation of the dispatch system coordinator during the subscription phase. At step 200, the dispatch system coordinator starts with an empty set of unsubscribed actions and an empty set of unsubscribed filters. Beginning at the end of the configuration data, the dispatch system coordinator begins reading upward (Step 202), adding action objects encountered to the unsubscribed action set (Steps 204 and 206). This continues until a filter object is encountered.

When a filter object is encountered, the members of the unsubscribed action set are subscribed to the filter object and removed from the unsubscribed action set. The filter object is added to the unsubscribed filter set (Steps 208 and 210). The loop defined by steps 202, 204, 206, 208 and 210 is repeated until a source object is encountered.

When a source object is encountered, the members of the unsubscribed filter set are subscribed to the source object and removed from the unsubscribed filter set (Step 212). The entire process is then repeated until the configuration data has been completely processed (Step 214).

Alternative Configuration Formats

The configuration data format described above is for illustrative purposes only. The present invention is not limited to any particular configuration data format. The format described above works well for three-level tree-shaped dispatcher systems (i.e. dispatcher systems in which each component has only one parent and where there is only one filter between any source and action object). However, a more sophisticated format may be required for other dispatcher system configurations.

For example, the configuration data may alternatively take the form of publisher/subscriber tuples. Based on this format, the configuration data:

(SRC s1, FLT f1)

(FLT f1, ACT a1)

(FLT f1, FLT f2)

(FLT f2, ACT a2)

would specify that filter f1 subscribes to source s1, and that action a1 and filter f2 subscribe to filter f1. Action a2 subscribes to filter f2. The internal data structure for publisher/subscriber relationships is 1represented as a directed acyclic graph to represent the publisher/subscriber tuples.

Exemplary Dispatching System

Figure 3:
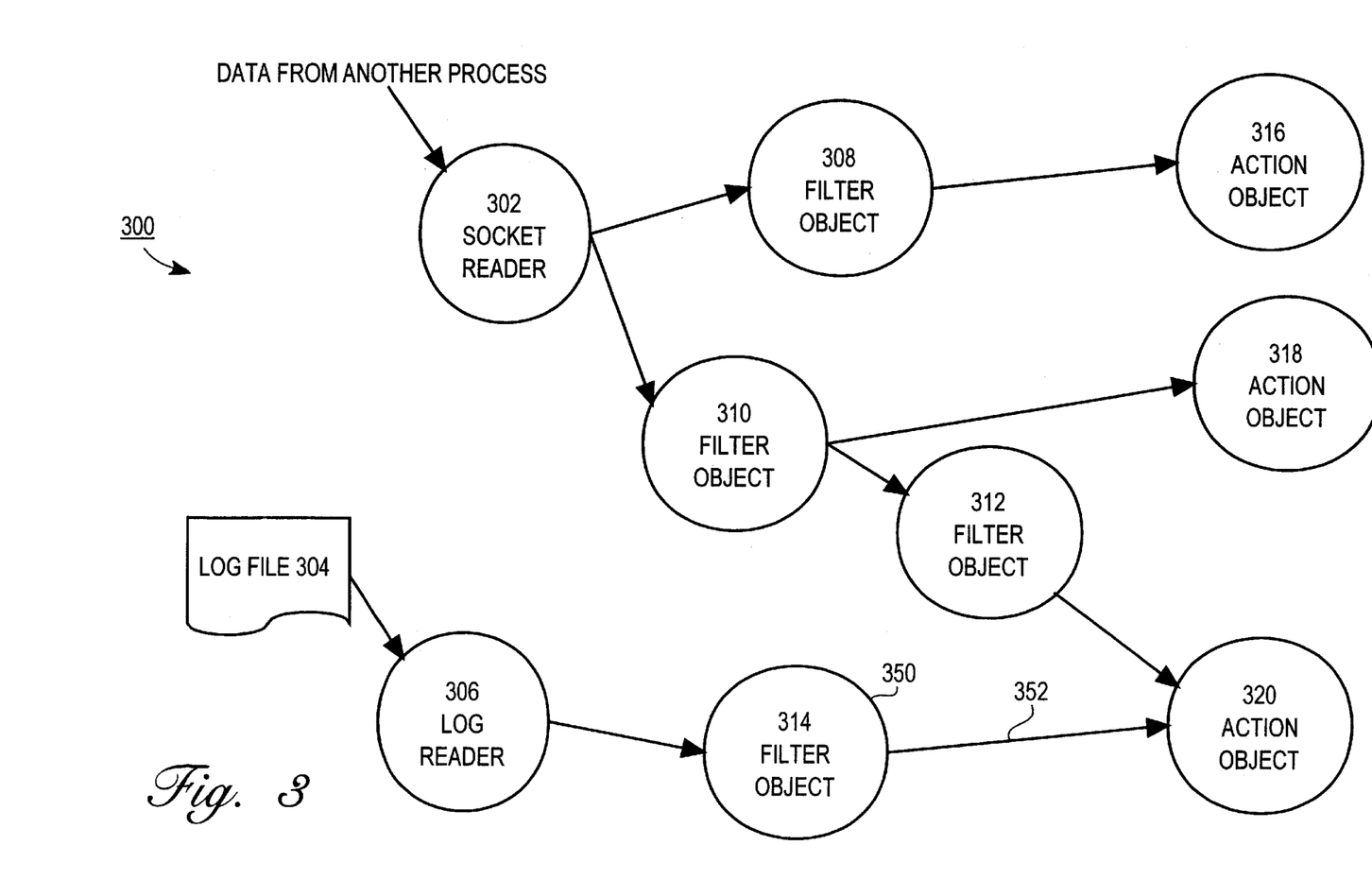
FIG. 3 is a block diagram illustrating an exemplary message dispatcher system according to an embodiment of the invention and a user interface for manipulating the dispatcher system.

Referring to FIG. 3, it is a block diagram that illustrates an exemplary dispatch system 300 according to an embodiment of the invention. System 300 includes two source objects: socket reader 302 and log reader 306. Socket reader 302 is configured to receive and publish messages based on data from another process (e.g. data received at a particular port). Log reader 306 is configured to read and publish messages based on data that is stored in a log file 304.

System 300 further includes a plurality of filter objects 308, 310, 312 and 314, and a plurality of action objects 316, 318 and 320. Filter object 308 and filter object 310 subscribe to messages published by socket reader 302. Filter object 312 subscribes to messages published by filter object 310. Filter object 314 subscribes to messages published by log reader 306.

Action object 316 subscribes to messages published by filter object 308. Action object 318 subscribes to messages published by filter object 310. Action object 320 subscribes to messages published by filter objects 312 and 314.

After the dispatch system coordinator has loaded and initialized the various objects in system 300, the dispatcher system coordinator launches socket reader 302 and log reader 306, causing them to begin execution in their own threads. The remaining components of system 300 are not launched, since they only execute upon being invoked by an object that is executing. For example, assume that socket reader 302 receives data from that socket that it is monitoring. Socket reader 302 publishes this message by invoking a method on each of its subscribers, and passing the message as an argument to the method.

For the purposes of explanation, the method of a subscriber that is invoked by a publisher to pass a message to the subscriber shall be referred to as the "update" method. Thus, in the present example, socket reader 302 would invoke the update method of filter object 308. The update method of filter object 308 would then execute. The update method of filter object 308 contains logic that determines how filter object 308 responds to the message. For the purposes of explanation, it shall be assumed that the logic of filter object 308 dictates that filter object 308 take no action on the particular message. This may occur, for example, if filter object 308 is programmed to filter out the particular type of message that was received from socket reader 308.

Execution of the thread associated with socket reader 302 would then return from filter object 308 to socket reader 302. Socket reader 302 would then send the message to the next subscriber in its subscription list (filter object 310) by invoking the update method of filter object 310. The update method of filter object 310 would then execute. The update method of filter object 310 contains logic that determines how filter object 310 responds to the message. For the purposes of explanation, it shall be assumed that the logic of filter object 310 dictates that filter object 310 publish the message thus received to its subscribers.

Filter object 310 would then send the message to the first subscriber in its subscription list (action object 318) by invoking the update method of action object 318. The update method of action object 318 would then execute. The update method of action object 318 contains logic that determines how action object 318 responds to the message. For the purposes of explanation, it shall be assumed that the logic of action object 318 causes a shell script to generate a message to another network management subsystem to alert the operator.

When execution of the shell script is complete, thread execution returns to action object 318. When the update method of action object 318 completes, thread execution returns to filter object 310.

Filter object 310 would then send the message to the next subscriber in its subscription list (filter object 312) by invoking the update method of filter object 312. The update method of filter object 312 would then execute. The update method of filter object 312 contains logic that determines how filter object 312 responds to the message. For the purposes of explanation, it shall be assumed that the logic of filter object 312 dictates that no action should be taken. Thread execution then returns to filter object 310.

At this point, filter object 310 has sent the message to all of the subscribers on its subscriber list. Therefore, thread execution returns to socket reader 302. Socket reader 302 then continues to monitor the port in which it is interested.

Java-Based Components

As mentioned above, the various components of the dispatch system are loaded and initialized by the dispatch system coordinator at runtime. According to an embodiment of the invention, the various components as well as the dispatch system coordinator itself are implemented as objects defined in JAVA classes. In JAVA, source code is compiled into class files of byte code. At runtime, class files are located and loaded into non-volatile memory on an as-needed basis. Once loaded, the class files are interpreted by an interpreter generally referred to as a JAVA virtual machine.

Specifically, when the currently-executing byte code invokes an object in a class that has not yet been loaded, a routine referred to as the JAVA class loader searches for the class file of the class. Typically, the JAVA class loader will search for the class file in locations identified in a search path. The locations are searched in sequence. Thus, the second location in the search path is searched only if the target class file is not found at the first location in the search path. If the target class file is not found at any locations in the search path, then the JAVA virtual machine generates an error. Depending on which class loader is used (default or application based), a class file can even originate from anywhere on the Internet as long as appropriate security restrictions are met.

The present invention uses JAVA's deferred loading of class files to increase the flexibility of the filtering system. Specifically, as long as a class has not already been loaded by the virtual machine, a class file for a particular class may be modified or even replaced with a different class file for the same class. Such changes, which when executed may significantly affect the functionality of the JAVA program, can be performed while the JAVA program is executing.

Runtime Configuration Modification

According to one embodiment of the invention, a user is presented with a graphical user interface that allows the user to specify changes in the configuration and behavior of the dispatcher system while it is executing. This user interface interacts with the dispatch system coordinator via a thread separate from the threads running the sources. Such configuration changes may include, for example, causing a filter object that is subscribed to one source to subscribe to a different source. Behavior changes may include, for example, causing a particular filter to switch from one filtering criteria to another.

The user interface may generate, for example, a display similar to that shown in FIG. 3. The user may use a pointing device, such as a mouse, to select the visual indicator associated with a particular component to be changed. For example, to change the behavior of filter object 314, the user may select circle 350. In response to selecting circle 350, the user may be presented with the operating parameter values currently in effect for filter object 314. The user may then revise the displayed parameter values to specify a change that should be made in the behavior of filter object 314. The methods used to revise filter or action parameters are synchronized to prevent parameters from changing while the filter or action logic is being invoked.

Similarly, a user may create an arrow, delete an arrow, or change the source or destination of an arrow to specify a change in the publisher-subscriber relationships between components. For example, a user may use a mouse to move the end of arrow 352 to point to the circle associated with action object 318 rather than the circle associated with action object 320. In response to this user input, action object 320 is removed from the subscriber list of filter object 314, and action object 318 is inserted into the subscriber list of filter object 314.

To facilitate configuration changes, publishers may implement the methods addSubscriber and removeSubscriber. These methods receive arguments that identify the component that should be respectively added or removed from the subscriber list of the publisher. The addSubscriber method of objects is called by the dispatch system coordinator to establish the subscription relationships of the initial dispatcher system configuration. Thus, in an embodiment where the dispatch system coordinator operates according to the flowchart illustrated in FIG. 2, the dispatch system coordinator calls the addSubscriber method of a filter object at step 210, and calls the addSubscriber method of a source object at step 212.

The addSubscriber and removeSubscriber methods may also be called after dispatcher system is executing in response to user input that specifies a change in the dispatcher system configuration. For example, a user may specify that a filter f1 that is currently subscribing to a source s1 be changed to subscribe to a different source s2. In response to this user input, the dispatch system coordinator invokes the removeSubscriber method of s1 and invokes the addSubscriber method of s2. For both invocations, the dispatch system coordinator passes an argument that identifies filter f1. In response to these invocations, s1 removes f1 from its subscriber list and s2 adds f1 to its subscriber list. Consequently, subsequent messages published by s1 will not be sent to f1, and subsequent messages published by s2 will be sent to f1. The addSubscriber and removeSubscriber methods are synchronized to prevent a subscriber from being added or removed while it is in the midst of being invoked.

Generic Publisher Class

To ensure that publishers consistently implement the basic functions common to all publishers, a generic publisher class may be defined. The generic publisher class specifies the interface of the methods that are common to all publishers. Classes for special purpose publishers may then be defined as child classes of the generic publisher class, thus inheriting the common publisher methods and interface. In JAVA, classes that specify the interface of a generic class without providing specific implementations for the methods of the class are referred to as abstract classes.

According to one embodiment of the invention, the generic publisher class defines the methods addSubscriber and removeSubscriber, as described above. In addition, the generic publisher class includes a removeAll method and a send method. When invoked, the removeAll method of a publisher object causes all subscribers to be removed from the subscriber list of the publisher object.

The send method of a publisher causes a message to be sent to all subscribers listed on the subscriber list of a publisher. This may be accomplished, for example, by calling the update method of each object that belongs to the subscriber list of the publisher.

Runtime Behavior Modification

According to an embodiment of the invention, the behavior of the various modules in the dispatcher system varies based on the values of the arguments with which the modules are initialized. For example, if the action object ShellAction is initialized with the arguments "log.sh reverse.txt", then the ShellAction object triggers the execution of the shell script "log.sh" upon receiving a message, and the shell script "log.sh" stores its output in the file "reverse.txt". On the other hand, if the same ShellAction object is initialized with the argument "other.sh", then the ShellAction object would trigger the execution of the shell script "other.sh" upon receiving a message. The shell script "other.sh" may do something completely different than the shell script "log.sh".

To facilitate configuration changes, objects must implement the method "initialize". When invoked on an object, this method receives arguments that affect the behavior of the object. According to one embodiment, the initialize method of objects is called by the dispatch system coordinator based on information retrieved from the configuration data to establish the initial behavior of the objects at the time they are loaded into memory.

The initialize method may also be called in response to user input that specifies a change in the behavior of an object within the dispatcher system after the dispatcher system is executing. For example, a user may specify that a filter f1 that is currently filtering out all messages except those originated at a particular Internet Protocol ("IP") address be changed to filter out all messages except those originated at a different IP address. In response to this user input, the dispatch system coordinator invokes the initialize method of filter f1 with arguments that specify the new IP address.

As described above, a generic publisher class may be used to establish a common interface for functions performed by all object classes that are publishers. According to one embodiment of the invention, the inheritance feature of object-oriented programming languages, such as JAVA, is used to establish common interfaces for functions shared by all members of other categories of objects as well. For example, a "loadable_object" class may be defined to include an "initialize" method, and all loadable objects (including source objects, filter objects and action objects) may be created as subclasses of the "loadable_object" class.

Network Management

According to an embodiment of the invention, a dispatching system that uses the techniques described herein is used in a network management environment to sift through the enormous amounts of data a network management system receives about the network it manages. For example, socket reader 302 may be configured to receive messages generated by routers and/or MIB variables received from the various devices on the networks. Similarly, log reader 306 may be configured to read from log files that store such information.

In such a configuration, filters 308, 310, 312 and 314 may be configured to filter out all data except for data that qualifies as "key information". The initialization parameters currently in effect for each filter determines which data qualifies as key information with respect to that filter. For example, socket reader 302 may be configured to receive the "syslog" messages generated by a router, and filter object 308 may be configured to filter out all messages but "configuration change" messages. Action object 316 may be configured to send alert messages to the network administrator in response to each configuration change message, or to log all configuration change messages to a special "debugging" log file.

Over time, the network administrator may become more or less selective in the types of data that should qualify as "key information". Using the techniques described above, the network administrator dynamically reconfigures the appropriate filter objects by re-initializing the objects with different argument values that establish new filtering criteria. Similarly, by re-initializing the action objects with different argument values, the network administrator may cause more, fewer, or different actions to be taken in response to detecting key information.

A method and system for filtering and acting upon data are provided. The specific identity, behavior and relationship between the various components that make up the system are not fixed at compile time. Rather, flexibility is maintained by establishing the identity, behavior and relationships based on configuration data at run time. At run time, various source, filter and action modules that are specified in configuration data are loaded into dynamic memory and initialized. The publisher-subscriber relationships are then established between the loaded modules based on said configuration data. A user interface is provided which allows a user to specify changes to the publisher-subscriber relationships between the components, or to the initialization arguments of the components. The various components of the system may be implemented as objects that are instances of JAVA classes.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for filtering data, the method comprising the steps of:

reading configuration data that specifies publisher-subscriber relationships between source modules in a set of source modules, filter modules in a set of filter modules, and action modules in a set of action modules;

wherein source modules in said set of source modules are software modules configured to obtain data from a source and transmit the data in messages to a set of subscribers;

wherein the set of subscribers to which each source module transmits messages is determined by information received by said source module while said source module is loaded into dynamic memory and not determined by code in said source module;

wherein filter modules in said set of filter modules are software modules configured to receive messages and provide filtering criteria that decides whether the messages should be dispatched to a set of subscribers;

wherein the set of subscribers to which each filter module dispatches messages is determined by information received by said filter module while said filter module is loaded in dynamic memory and not determined by code in said filter module;

wherein action modules in said set of action modules are software modules configured to respond to messages by performing actions;

creating a set of loaded modules by loading, into dynamic memory, modules that belong to said set of source modules, said set of filter modules and said set of action modules;

initializing said set of loaded modules;

establishing said publisher-subscriber relationships between said set of loaded modules based on said configuration data;

wherein the step of establishing publisher-subscriber relationships includes sending information, based on said configuration data, to each source module in said set of loaded modules to indicate to said source module the set of subscribers to which said source module is to transmit messages; and sending information, based on said configuration data, to each filter module in said set of loaded modules to indicate to said filter module the set of substribers to which said filter module is to dispatch messages.

2. The method of claim 1 wherein:

said set of loaded modules includes a first source module and a first filter module;

said step of establishing said publisher-subscriber relationships includes causing said first source module to include said first filter module in a subscriber list maintained for said first source module;

when executing, said first source module receives data from one or more sources; and upon receiving data from said one or more sources, said first source module sends a message to all modules listed in said subscriber list maintained for said first source module.

3. The method of claim 2 wherein:

said step of establishing said publisher-subscriber relationships includes causing said first filter module to maintain a subscriber list;

upon receiving said message from said first source module, said first filter module determines whether said message satisfies a particular set of criteria; and if said message satisfies said particular set of criteria, then said first filter module sends a message to all modules listed in said subscriber list maintained for said filter module.

4. The method of claim 3 wherein:

said subscriber list maintained for said first filter module includes a first action module; and upon receiving said message from said first filter module, said first action module performs a particular action.

5. The method of claim 3 wherein:

said configuration data includes a particular set of arguments that specify said particular set of criteria; and said step of initializing said loaded modules includes initializing said first filter module with said particular set of arguments to cause said first filter module to filter based on said particular set of criteria.

6. The method of claim 5 further comprising the steps of:

after said step of initializing said set of loaded modules, receiving user input that specifies a second set of criteria that is different from said particular set of criteria;

generating a second set of arguments that reflect said second set of criteria; and re-initializing said first filter module with said second set of arguments to cause said first filter module to filter based on said second set of criteria.

7. The method of claim 1 wherein:

said set of loaded modules includes a first filter module and a first action module;

said step of establishing said publisher-subscriber relationships includes causing said first filter module to include said first action module in a subscriber list maintained for said first filter module;

upon receiving a message from another loaded module, said first filter module determines whether said message satisfies a particular set of criteria; and if said message satisfies said particular set of criteria, then said first filter module sends a message to all modules listed in said subscriber list maintained for said filter module.

8. The method of claim 7 wherein:

said configuration data includes a particular set of arguments that specify a particular action to be performed by said action module; and said step of initializing said loaded modules includes initializing said first action module with said particular set of arguments to cause said first action module to perform said particular action upon receipt of a message from said first filter module.

9. The method of claim 8 wherein:

after said step of initializing said set of loaded modules, receiving user input that specifies a second action that is different from said particular action;

generating a second set of arguments that reflect said second action; and re-initializing said first action module with said second set of arguments to cause said first action module to perform said second action in response to messages from said first filter module.

10. The method of claim 1 further comprising the steps of:

after said set of source modules are executing, receiving input that specifies changes to said publisher-subscriber relationships between said loaded modules; and changing said publisher-subscriber relationships in response to said input.

11. The method of claim 1 wherein:

said loaded modules are objects that are instances of JAVA classes;

the step of loading includes the step of searching a search path to locate code associated with said JAVA classes;

and the step of causing said source modules to begin execution is performed by causing each of one or more source objects that belong to said loaded modules to begin execution in a separate thread.

12. The method of claim 1 further comprising the step of executing a dispatcher system coordinator object in a thread to perform the steps of:

reading said configuration data;

loading and initializing said set of loaded modules;

establishing said publisher-subscriber relationships; and causing said source modules to begin execution.

13. A computer-readable medium carrying one or more sequences of instructions for filtering data, wherein execution of the one or more sequences of instructions by one or more processors causes the one or more processors to perform the steps of:

reading configuration data that specifies publisher-subscriber relationships between source modules in a set of source modules, filter modules in a set of filter modules, and action modules in a set of action modules;

wherein source modules in said set of source modules are software modules configured to obtain data from a source and transmit the data in messages to a set of subscribers;

wherein the set of subscribers to which each source module transmits messages is determined by information received by said source module while said source module is loaded into dynamic memory and not determined by code in said source module;

wherein filter modules in said set of filter modules are software modules configured to receive messages and provide filtering criteria that decides whether the messages should be dispatched to a set of subscribers;

wherein the set of subscribers to which each filter module dispatches messages is determined by information received by said filter module while said filter module is loaded in dynamic memory and not determined by code in said filter module;

wherein action modules in said set of action modules are software modules configured to respond to messages by performing actions;

creating a set of loaded modules by loading, into dynamic memory, modules that belong to said set of source modules, said set of filter modules and said set of action modules;

initializing said set of loaded modules;

establishing said publisher-subscriber relationships between said set of loaded modules based on said configuration data;

wherein the step of establishing publisher-subscriber relationships includes sending information, based on said configuration data, to each source module in said set of loaded modules to indicate to said source module the set of subscribers to which said source module is to transmit messages; and sending information, based on said configuration data, to each filter module in said set of loaded modules to indicate to said filter module the set of subscribers to which said filter module is to dispatch messages.

14. The computer-readable medium of claim 13 wherein:

said set of loaded modules includes a first source module and a first filter module;

said step of establishing said publisher-subscriber relationships includes causing said first source module to include said first filter module in a subscriber list maintained for said first source module;

when executing, said first source module receives data from one or more sources; and upon receiving data from said one or more sources, said first source module sends a message to all modules listed in said subscriber list maintained for said first source module.

15. The computer-readable medium of claim 14 wherein:

said step of establishing said publisher-subscriber relationships includes causing said first filter module to maintain a subscriber list;

upon receiving said message from said first source module, said first filter module determines whether said message satisfies a particular set of criteria; and if said message satisfies said particular set of criteria, then said first filter module sends a message to all modules listed in said subscriber list maintained for said filter module.

16. The computer-readable medium of claim 15 wherein:

said configuration data includes a particular set of arguments that specify said particular set of criteria; and said step of initializing said loaded objects includes initializing said first filter module with said particular set of arguments to cause said first filter module to filter based on said particular set of criteria.

17. The computer-readable medium of claim 16 further comprising instructions for performing the steps of:

after said step of initializing said set of loaded modules, receiving user input that specifies a second set of criteria that is different from said particular set of criteria;

generating a second set of arguments that reflect said second set of criteria; and re-initializing said first filter module with said second set of arguments to cause said first filter module to filter based on said second set of criteria.

18. The computer-readable medium of claim 13 wherein:

said set of loaded modules includes a first filter module and a first action module;

said step of establishing said publisher-subscriber relationships includes causing said first filter module to include said first action module in a subscriber list maintained for said first filter module;

upon receiving a message from another loaded module, said first filter module determines whether said message satisfies a particular set of criteria; and if said message satisfies said particular set of criteria, then said first filter module sends a message to all modules listed in said subscriber list maintained for said filter module.

19. The computer-readable medium of claim 18 wherein:

said configuration data includes a particular set of arguments that specify a particular action to be performed by said action module; and said step of initializing said loaded objects includes initializing said first action module with said particular set of arguments to cause said first action module to perform said particular action upon receipt of a message from said first filter module;

after said step of initializing said set of loaded modules, receiving user input that specifies a second action that is different from said particular action;

generating a second set of arguments that reflect said second action; and re-initializing said first action module with said second set of arguments to cause said first action module to perform said second action in response to messages from said first filter module.

20. The computer-readable medium of claim 13 further comprising instructions for performing the steps of:

after said set of source modules are executing, receiving input that specifies changes to said publisher-subscriber relationships between said loaded modules; and changing said publisher-subscriber relationships in response to said input.

21. The computer-readable medium of claim 13 wherein:

said loaded modules are objects that are instances of JAVA classes;

the step of loading includes the step of searching a search path to locate code associated with said JAVA classes;

and the step of causing said source modules to begin execution is performed by causing each of one or more source objects that belong to said loaded modules to begin execution in a separate thread.

22. A system for filtering data comprising:

a set of one or more source modules loaded and executing in memory;

wherein source modules in said set of source modules are software modules configured to obtain data from a source and transmit the data in messages to a set of subscribers;

wherein the set of subscribers to which each source module transmits messages is determined by information received by said source module while said source module is loaded into dynamic memory and not determined by code in said source module;

a set of one or more filter modules loaded in memory;

wherein filter modules in said set of filter modules are software modules configured to receive messages and provide filtering criteria that decides whether the messages should be dispatched to a set of subscribers;

wherein the set of subscribers to which each filter moduled dispatches messages is determined by information received by said filter module when said filter module is executing and not determined by code in said filter module;

a set of one or more action modules loaded in memory;

wherein action modules in said set of action modules are software modules configured to respond to messages by performing actions;

said set of source modules including a first source module that receives data from a source and responds to receipt of said data by transmitting messages to each subscriber in a first list of subscribers;

said set of filter modules including a filter module that receives messages from a source module in said set of source modules and responds to receipt of said messages by determining whether said messages satisfy a set of criteria; and transmitting messages to a second list of subscribers if said messages from said source module satisfy said set of criteria;

said set of action modules including a first action module that receives messages from a filter module in said set of filter modules and responds to receipt of said messages by performing a particular action;

wherein members of said first list of subscribers are established when said first source module is loaded into said memory; and wherein members of said second list of subscribers are established when said first filter module is loaded into said memory.

23. The system of claim 22 further comprising a system coordinator configured to read configuration data that specifies said set of source modules, said set of filter modules, and said set of action modules;

said system coordinator being further configured to load said set of source modules, said set of filter modules, and said set of action modules into said memory in response to said configuration data.

24. The system of claim 23 wherein:

the configuration data further specifies publisher-subscriber relationships between source modules in said set of source modules, filter modules in said set of filter modules, and action modules in said set of action modules; and the system coordinator is configured to establish members of said first list of subscribers and said second list of subscribers in response to said configuration data.

25. The system of claim 24 wherein said system coordinator changes members of at least one of said first subscription list and said second subscription list in response to input received after said set of source objects have begun executing.

26. The system of claim 22 further comprising a system coordinator configured to respond to particular user input by causing said first action module to change said particular action.

27. The system of claim 22 further comprising a system coordinator configured to respond to particular user input by changing said set of criteria used by said first filter module.

28. A system for filtering data comprising:

a set of one or more source modules loaded and executing in memory;

wherein said source modules are software modules configured to obtain data and transmit the data in messages to a set of subscribers;

a set of one or more filter modules loaded in memory;

wherein said filter modules are software modules configured to receive messages and provide filtering criteria that decides whether the messages should be dispatched to a set of subscribers;

wherein one or more of the filtering criteria used by said filter modules is determined by information received by said filter modules when said filter modules are loaded into dynamic memory, and not determined by code in said filter modules;

a set of one or more action modules loaded in memory;

wherein said action modules are software modules configured to respond to messages by performing actions;

wherein one or more of said actions performed by said action modules in response to messages are determined by information received by said action modules when said action modules are loaded into dynamic memory, and not by determined code in said filter modules;

said set of source modules including a first source module that receives data from a source and responds to receipt of said data by transmitting messages to each subscriber in a first list of subscribers;

said set of filter modules including a filter module that receives messages from a source module in said set of source modules and responds to receipt of said messages by determining whether said messages satisfy a set of criteria; and transmitting messages to a second list of subscribers if said messages from said source module satisfy said set of criteria;

said set of action modules including a first action module that receives messages from a filter module in said set of filter modules and responds to receipt of said messages by performing a particular action;

wherein said set of criteria is established when said first filter module is loaded into said memory; and wherein said particular action is established when said first action module loaded into said memory.

29. A method for filtering data, the method comprising the steps of:
   receiving user input from a user that specifies
      relationships between source modules, filter modules and action modules; and
      criteria to be used by said filter modules;
   wherein said source modules are software modules configured to obtain data and transmit the data in messages to a set of subscribers;
   wherein said filter modules are software modules configured to receive messages and provide filtering criteria that decides whether the messages should be dispatched to a set of subscribers;
   wherein one or more of the filtering criteria used by said filter modules is determined by information received by said filter modules when said filter modules are loaded into dynamic memory, and not determined by code in said filter modules;
   wherein said action modules are software modules configured to respond to messages by performing actions;
   based on said user input, loading and initializing a filtering system that includes
      filter modules that filter information from said source modules based on said criteria, and
      action modules that perform said actions in response to messages from said filter modules; and
   wherein the step of initializing includes sending information to said filter modules after said filter modules are loaded, said information causing said filter modules to filter based on said criteria indicated in said user input.

30. The method of claim 29 wherein said step of initializing includes initializing a first filter module with a particular set of arguments to cause said first filter module to filter based on said particular set of criteria.

31. The method of claim 30 further comprising the steps of:
   after said step of initializing, receiving user input that specifies a second set of criteria that is different from said particular set of criteria;
   generating a second set of arguments that reflect said second set of criteria; and
   re-initializing said first filter module with said second set of arguments to cause said first filter module to filter based on said second set of criteria.

32. The method of claim 29 further comprising the steps of:
   after initializing said filtering system, receiving user input that makes a modification to said relationships between said source modules, action modules and filter modules; and
   while said filtering system is in operation, modifying said relationship between said source modules, action modules and filter modules based on said user input.

33. The method of claim 32 further comprising the step of generating a user interface through which a user can specify changes to said relationships.

34. The method of claim 29 wherein one of said action modules causes a notification to be displayed to a user in response to receipt of a message from a filter.

35. The method of claim 29 further comprising the step of displaying a user interface for communicating to a user a set of parameter values that are currently in effect within said filtering system.

36. The method of claim 35 wherein said user interface includes controls that allow a user to change said set of parameter values that are currently in effect within said filtering system.

* * * * *